Figure 1:
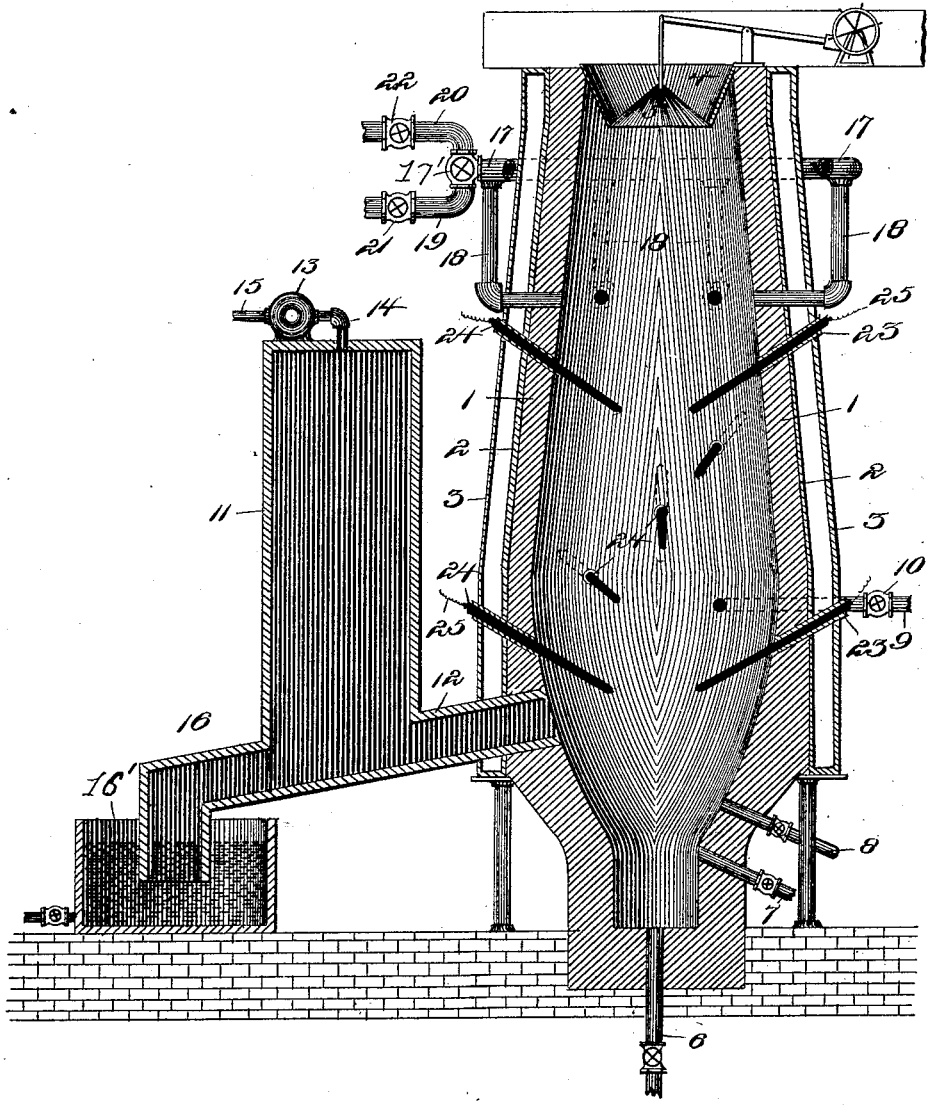

No. 641,976. Patented Jan. 23, 1900.
R. H. LAIRD.
DOWNDRAFT ELECTRICAL FURNACE.
(Application filed July 24, 1897.)
(No Model.) 2 Sheets—Sheet 1.

Witnesses
Inventor
R. H. Laird.
By
Henry C Evert
Attorney

THE NORRIS PETERS CO., PHOTO-LITHO., WASHINGTON, D. C.

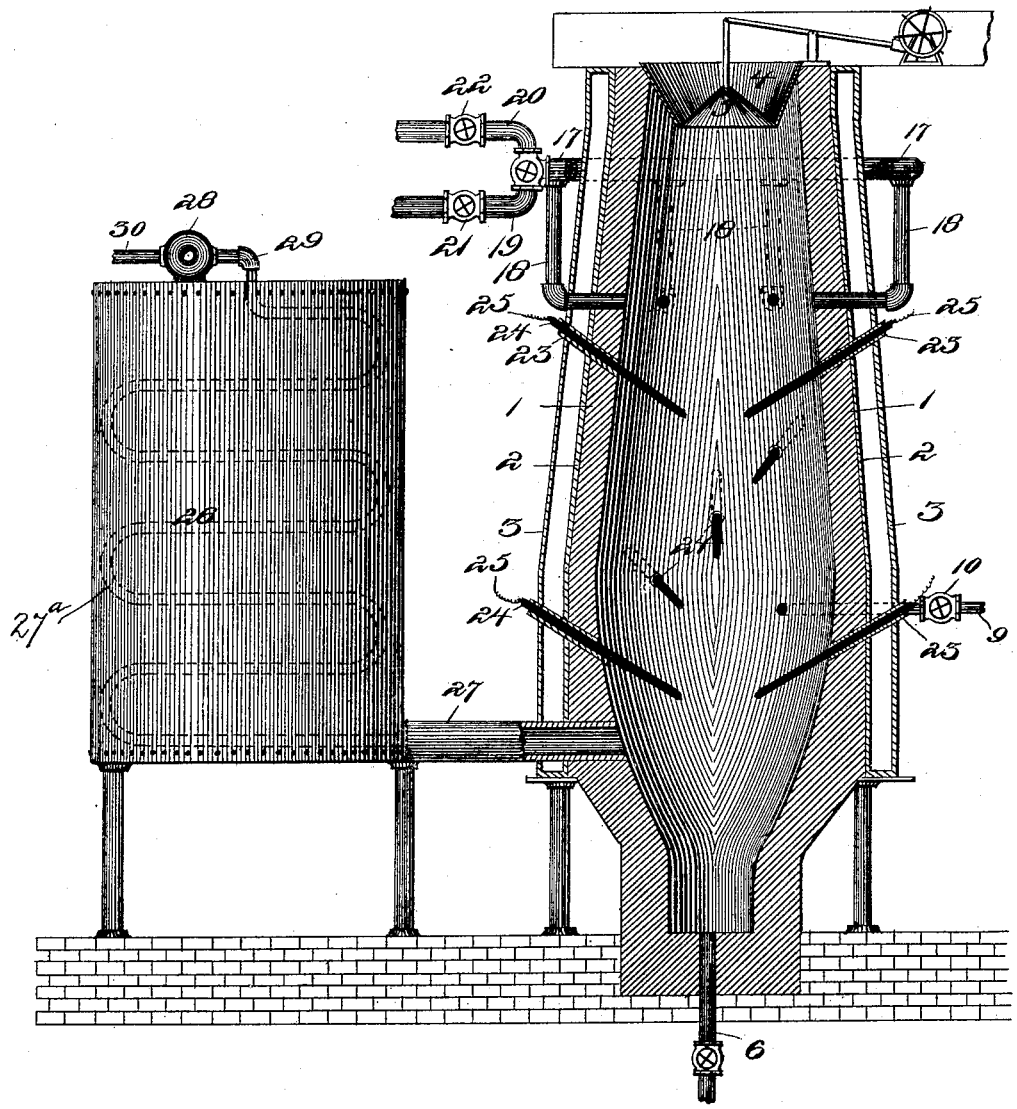

UNITED STATES PATENT OFFICE.

ROBERT H. LAIRD, OF PITTSBURG, PENNSYLVANIA.

DOWNDRAFT ELECTRICAL FURNACE.

SPECIFICATION forming part of Letters Patent No. 641,976, dated January 23, 1900.

Application filed July 24, 1897. Serial No. 645,814. (No model.)

*To all whom it may concern:*

Be it known that I, ROBERT H. LAIRD, a citizen of the United States of America, residing at Pittsburg, in the county of Allegheny and State of Pennsylvania, have invented certain new and useful Improvements in Downdraft Electrical Furnaces, of which the following is a specification, reference being had therein to the accompanying drawings.

This invention relates to certain new and useful improvements in downdraft electrical furnaces.

The object of my invention is to construct a furnace of this type whereby metals—such as gold, silver, and the like—are sufficiently heated by electrical action to separate the same from the ore.

Briefly described, my invention consists of a suitable furnace surrounded by a water-jacket and having projecting through the walls into the interior of the furnace a series of electrodes, which are arranged in pairs and at an angle to the wall of the furnace.

When the ore is placed in the furnace, the contact of the same with the electrodes forms an arc, and the metals in the ore are separated therefrom, and being reduced to a molten state they fall to the bottom of the furnace and are removed by suitable means therefrom. Means is also provided for collecting the gases generated in the furnace during the decomposition of the ores, and, furthermore, with suitable connections for forcing air or steam through the ores to increase combustion and creating a downdraft within the furnace and at the same time expelling the gases into the storage-chamber.

In describing the invention in detail reference is had to the accompanying drawings, forming a part of this specification, and wherein like numerals of reference indicate corresponding parts throughout both views thereof, and in which—

Figure 1 is a vertical sectional view of my improved furnace. Fig. 2 is a like view showing modified form of furnace with collecting-tank for the gases.

Referring now to the drawings, 1 indicates the walls of the furnace, which are preferably composed of any refractory material. This furnace-wall is surrounded by a water-jacket, in which 2 indicates the inner wall, and 3 the outer wall. This jacket is preferably composed of a metallic material.

A hopper 4 is arranged in the upper part of the furnace and is provided with a bell-closure 5, the latter being supported and operated in any of the well-known manners. The furnace is provided at its bottom with a blow-off pipe 6 and also has arranged in its side, near the bottom, the draw-off pipes 7 and 8 for removing the molten metal from the furnace. The furnace is further provided with a suitable water-supply 9, having a cut-off 10, for cleaning the interior of the furnace.

11 indicates a gas-tank arranged at one side and connected to the furnace by means of the branch 12. This tank is provided with an elbow-shaped branch 16, the free end thereof projecting into a water seal 16'. This tank 11 has mounted on the top thereof an exhaust-fan 13, connected to the tank 11 by means of a pipe 14, and has a pipe 15 connecting the same to a storage-tank. (Not shown.)

Arranged around the furnace, near the top thereof, is a supply-pipe 17, connected by means of the pipes 18 to the interior of the furnace. This supply-pipe 17 is connected to a three-way cock or union 17', having pipes 19 and 20 communicating therewith for furnishing air or steam or air and steam separately to the supply-pipe 17, which is connected to the pipes 18, the air or steam being injected into the furnace to cause a downdraft as well as increasing combustion. The pipes 19 and 20 have arranged therein suitable cut-offs 21 and 22.

Extending through the water-jacket and wall of the furnace at an incline to the furnace-wall is a series of tubes 23, which are arranged in two spiral rows around the furnace in such a manner that the tubes of one row will be opposite the tubes of the other row on the opposite side of the furnace. These tubes are adapted to receive and support the inwardly-extending electrodes 24, having suitable electrical connections 25 to a source of electrical supply. These electrodes extend for some distance into the furnace, the ends of the one row of electrodes on the one side of the furnace being opposite to the ends of the other row on the opposite side of the furnace, so that as the ore comes in contact with the inner end of the electrodes an arc is formed, and the current passing through the ore produces sufficient heat to reduce the metal to a molten state, which when in such condition falls to the bottom of the furnace and is drawn through the pipes 7 and 8, while the gases resulting therefrom are carried off through the branch 12 into the tank 11, where they are exhausted therefrom by means of the exhaust-fan 13 and its connections into a suitable storage-receptacle. If desired, any well-known means may be employed for cooling the gases within the tank 11 or otherwise.

In Fig. 2 of the drawings I have shown a cooling-tank for the gas, consisting of the closed tank 26, containing a suitable cooling medium. This tank is connected to the furnace by means of the branch 27, registering with the discharge-pipe 27$^a$ for the gas, which is arranged spirally within the tank. The upper end of this pipe 27$^a$ is connected to the exhaust-fan 28 by the pipe connections 29. 30 indicates a pipe which is connected at its one end to the exhaust-fan 28 and at its other end to a gas-storage chamber. (Not shown.)

It will of course be observed that the ore is fed into the furnace through the hopper 4 and that the bell-closure 5 normally closes the same, excepting during the charging operation. During the reducing or separation of the ores a downdraft is obtained and the combustion increased by means of the supply-pipe 17 and its various connections, as heretofore described.

It will be noted that various changes may be made in the details of construction without departing from the general spirit of my invention.

Having fully described my invention, what I claim as new, and desire to secure by Letters Patent, is—

1. In an electrical downdraft-furnace, having walls of suitable refractory material, a jacket of metal surrounding said walls and provided with a receptacle to receive cooling means, two sets of spirally-arranged electrodes projecting through the walls of said furnace, said electrodes being arranged at an angle to the outer face thereof, and opposite each other, insulating stuffing-boxes arranged around said electrodes, flues communicating with the lower part of said furnace whereby the by-products of metals fed into said furnace are removed, substantially as herein shown and described.

2. A downdraft electrical furnace consisting of a receptacle provided with a cone-shaped bottom, said receptacle having lining of suitable refractory material, a water-jacket surrounding said receptacle, a hopper arranged in the upper part of said receptacle, a bell-shaped closure for said hopper, a double series of spirally-arranged electrodes projecting through the water-jacket and wall of the furnace and at an angle to the face thereof, flues arranged in the lower part of the furnace whereby the by-products are removed, and means carried by the upper part of the furnace whereby water and vapor are supplied to aid combustion, substantially as herein shown and described.

3. In an electrical furnace, a receptacle provided with a suitable closure, flues communicating with the lower part of said receptacle, two rows of spirally-arranged electrodes projecting through the receptacle and at an angle to the face thereof, a water-jacket surrounding said receptacle, a tank arranged at one side of said furnace and communicating therewith by means of a pipe, and a fan secured to the top of said tank whereby the gaseous products generated in the furnace are exhausted, substantially as herein shown and described.

In testimony whereof I affix my signature in presence of two witnesses.

ROBERT H. LAIRD.

Witnesses:
W. H. TIMMERMANN,
THOS. M. BOYD, Jr.